(12) United States Patent
Pell et al.

(10) Patent No.: US 8,631,380 B2
(45) Date of Patent: Jan. 14, 2014

(54) METHOD OF, AND APPARATUS FOR, DATA PATH OPTIMISATION IN PARALLEL PIPELINED HARDWARE

(75) Inventors: Oliver Pell, London (GB); Jacob Alexis Bower, London (GB); Richard Berry, London (GB); Stefan Rolf Bach, London (GB); Oliver Kadlcek, London (GB)

(73) Assignee: Maxeler Technologies, Ltd., London (GB)

( * ) Notice: Subject to any disclaimer, the term of this patent is extended or adjusted under 35 U.S.C. 154(b) by 0 days.

(21) Appl. No.: 13/305,261

(22) Filed: Nov. 28, 2011

(65) Prior Publication Data

US 2013/0139122 A1 May 30, 2013

(51) Int. Cl.
*G06F 17/50* (2006.01)
(52) U.S. Cl.
USPC .......................................... 716/132; 716/113
(58) Field of Classification Search
USPC .................................................. 716/113, 132
See application file for complete search history.

(56) References Cited

U.S. PATENT DOCUMENTS 6,674,536 B2 * 1/2004 Long et al. ................... 358/1.15

* cited by examiner

*Primary Examiner* — Thuan Do
(74) *Attorney, Agent, or Firm* — Conley Rose, P.C.

(57) ABSTRACT

A method of generating a hardware design for a pipelined parallel stream processor, by defining a hardware processing operation; specifying at least one propagation rule; defining a graph representing the processing operation in the time domain, comprising at least one data path to be implemented as a hardware design and a plurality of parallel branches; each data path having: at least one data path input, output, and discrete object corresponding to a hardware element; each discrete object comprises an input for receiving an input variable, an operator for executing a function on said input variable, and an output variable; optimizing each output from each discrete object in dependence upon the propagation rule to produce an optimised graph; and utilizing the optimised graph to define an optimised hardware design for implementation in said pipelined parallel stream processor.

25 Claims, 5 Drawing Sheets

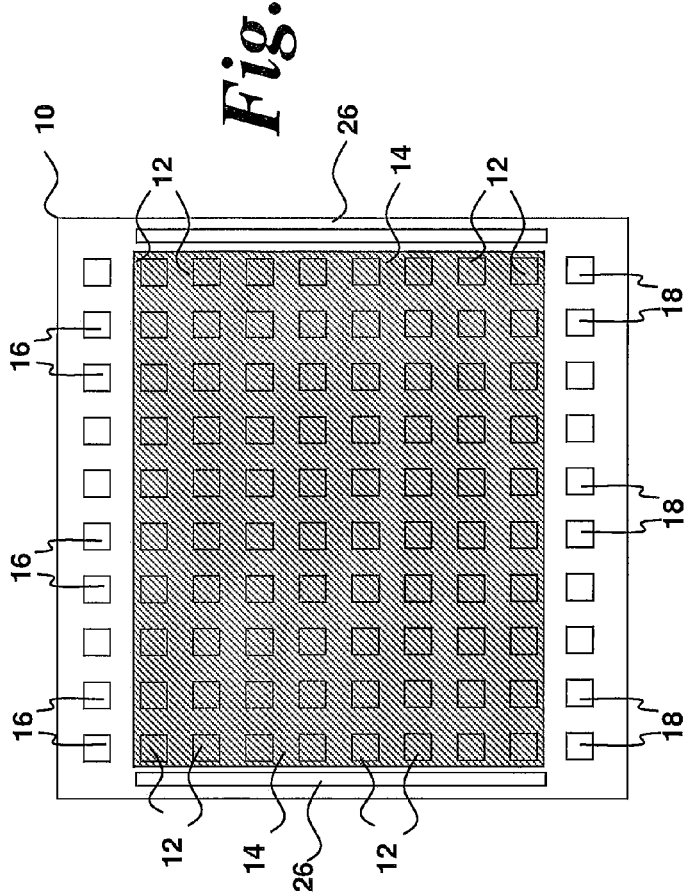
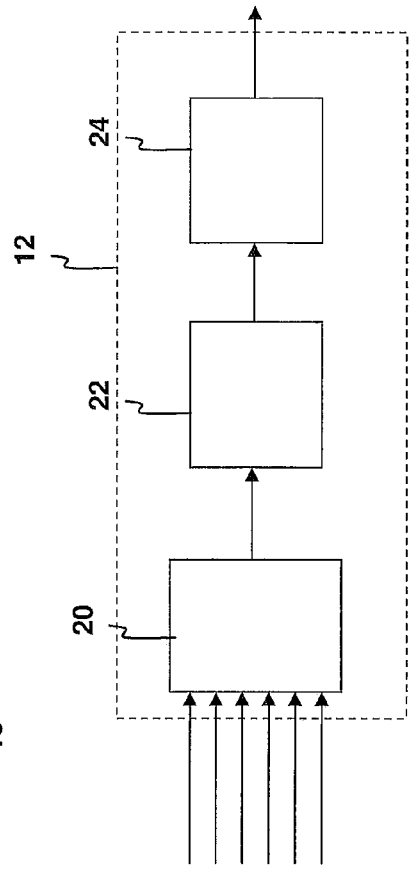

METHOD OF, AND APPARATUS FOR, DATA PATH OPTIMISATION IN PARALLEL PIPELINED HARDWARE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a method of, and apparatus for, optimisation of data paths in parallel pipelined hardware. In one embodiment, the present invention relates to a method of, and apparatus for, optimisation of data paths of a stream processor for implementation on a Field-Programmable Gate Array (FPGA).

Computer systems are often used to solve complex numerical calculations. Often, a multiplicity of iterations of a calculation is required in order to compute variables in a computation such as the modelling of real-world phenomena such as wave propagation in a medium. Such calculations often comprise many dimensional arrays and vast numbers of data points. As such, these calculations require considerable computing resources to complete.

One approach to improve the speed of a computer system for specialist computing applications is to use additional or specialist hardware accelerators. These hardware accelerators increase the computing power available and concomitantly reduce the time required to perform the calculations.

A suitable system is a stream processing accelerator having a dedicated local memory. The accelerator may be located on an add-in card which is connected to the computer via a bus such as Peripheral Component Interconnect Express (PCI-E). The bulk of the numerical calculations can then be handled by the specialised accelerator.

Stream processor accelerators can be implemented using, for example, Field-Programmable Gate Arrays (FPGAs), Application Specific Integrated Circuits (ASICs) and/or structured ASICs. In certain cases, such arrangement may increase the performance of highly parallel applications by over an order of magnitude or more.

A schematic example of an FPGA device is shown in FIG. 1. Different types of FPGA chips may be used; however the larger and more arithmetic function-rich FPGAs are more desirable. The FPGA 10 comprises a programmable semiconductor device which comprises a matrix of configurable logic blocks (CLBs) 12 connected via programmable reconfigurable interconnects 14 (shown here as the shaded area in FIG. 1). In order to get data into and out of the FPGA 10, a plurality of input pads 16 and output pads 18 are provided.

The CLBs 12 are the basic logic unit of the FPGA 10. A schematic diagram of a typical CLB 12 is shown in FIG. 2. The CLB 12 comprises a configurable switch matrix comprising typically a 4 or 6 input look up table (LUT) 20, which in some cases may also be configurable as a small buffer of up to about 32 bits, some specialist circuitry (such as, for example, a multiplexer), one or more flip-flop units 22 which act as temporary memory storage and an output 24. Additionally, an FPGA 10 comprises a plurality of block memory units 26. The block memory units 26 comprise addressable memory units which can be used as storage buffers in the FPGA 10.

The LUTs 20 of each CLB 12 can be configured to perform a variety of functions; for example, logic gates such as NAND and XOR, or more complex functions. A typical FPGA may comprise up to $10^5$ LUTs 20. The CLBs 12 are able to operate in parallel, providing a powerful resource for numerically-intense calculations.

FPGA-based stream processors comprise calculation functions mapped into one or more hardware units along the path from input to output. The FPGA then performs the computation by streaming the data items through the hardware units. Once the computation is complete, the data then moves "downstream" to further hardware units or to an output. The streaming architecture makes efficient utilization of the computation device, as every part of the circuit is performing an operation on one corresponding data item in the data stream at any point during the calculation.

FIG. 3 shows an example of such a streaming architecture created using the CLBs 12 of the FPGA to implement a stream processor thereon. FIG. 3 shows a 4 input 16-$i$, 4 output 18-$i$ stream computing engine which can be implemented on the FPGA stream processor 10.

Between the inputs 16-$i$ and the outputs 18-$i$ is provided a computational data path 30. The computational data path 30 is a graphical representation of an algorithm as it is expressed in hardware. The computational data path 30 is also referred to as a kernel. A typical FPGA 10 may comprise a multiplicity of parallel kernels.

The computational data path 30 is implemented using the CLBs 12 and other logic and comprises arithmetic operations 32 (performed in one or more LUTs 20) and buffer memories 26. In other words, each arithmetic unit 32 is implemented in hardware as a hardware element (which may comprise one or more hardware units) on the FPGA. The buffer memories 26 may comprise either block RAM (as provided by the block memory units 26) or distributed RAM (comprising the memory made available through use of the LUTs 20 or flip flops 22). As shown, the computational data path 30 is arranged to process data in parallel.

In operation, the data is streamed through the CLBs 12 of the FPGA stream processor 10 and the arithmetic operations 32 are carried out on the data as it is streamed.

Often, FPGA circuits are designed using circuit schematics or a hardware description language (HDL) such as, for example, Verilog. HDLs are used to write synthesisable specifications for FPGA hardware. A simulation program is run which enables simulation of the desired spatial and temporal configuration of the FPGA so that the operation of the FPGA can be modelled accurately before being physically created. HDLs include syntax for expressing parallelism (also known as concurrency) and may include an explicit notion of time.

A number of different numerical arithmetic formats are available for use by the accelerator hardware in order to perform numerical calculations. Two commonly used numerical formats are floating point arithmetic and fixed point arithmetic.

The floating-point data format representation is used to represent numbers which cannot be efficiently represented as integers. Floating-point format numbers are in general represented to a fixed number of significant digits and scaled using an exponent and, as such, is similar in concept to scientific notation. The base for the scaling is normally 2, 10 or 16. The typical number that can be represented exactly is of the form shown in Equation 1:

$$M \times B^e \qquad \text{(Equation 1)}$$

Where M is known as the "mantissa", B is the base and e is the exponent. The mantissa M comprises a digit string of a given length in a given base B' (which may be the same as B or different). The radix point is not explicitly included, but is implicitly assumed to lie in a certain position within the mantissa—often just after or just before the most significant digit, or to the right of the rightmost digit. The length of the mantissa determines the precision to which numbers can be represented.

The mantissa is multiplied by the base B raised to the power of the exponent e. If B is the base for the mantissa, then this operation is equivalent to shifting the radix point from its implied position by a number of places equal to the value of the exponent—to the right if the exponent is positive or to the left if the exponent is negative. Alternatively, the B may differ from the base of the mantissa for example, the mantissa could be binary but B=4.

The term "floating-point" relates to the ability of the radix point (or decimal point) to "float". By this is meant that the radix point can be placed anywhere relative to the significant digits of the mantissa.

A number of different floating-point representations have been used in computers. However, a widely adopted standard is that defined by the IEEE 754 Standard, the most common formats of which are single precision and double precision. Single precision is a binary format that occupies 32 bits (4 bytes) and its mantissa has a precision of 24 bits (about 7 decimal digits). Any integer with absolute value less than or equal to $2^{24}$ can, therefore, be exactly represented in the single precision format. Double precision is a binary format that occupies 64 bits (8 bytes) and its mantissa has a precision of 53 bits (about 16 decimal digits). Therefore, any integer with absolute value less than or equal to $2^{53}$ can be exactly represented in the double precision format.

In contrast, a fixed-point data format representation comprises a number having a fixed number of digits after (and sometimes also before) the radix point (or decimal point). The fixed-point data format comprises an integer scaled by a specific scale factor determined by the type. For example, in order to represent the binary value 1.01, the fixed point binary number 1010 could be used with binary scaling factor of $\frac{1}{1000}$. Generally, the scaling factor is the same for all values of the same type, and does not change during a computation. In most computational uses, the scaling factor is generally a power of two for use with binary notation. However, other scaling factors may be used.

When implemented on an FPGA, fixed point arithmetic units have an advantage over floating point units in that they require significantly less logic area to implement in hardware. For example, consider a floating point adder consisting of an "add block" that combines two inputs to produce one output.

A floating point adder for IEEE 754 single precision 32-bit floating point requires three computational stages: 1) to align the smaller input to the same exponent as the larger input, requiring the use of a barrel shifter; 2) to add the two mantissas (a fixed-point add); and 3) to normalize the result to the top of the floating point mantissa and calculate the exponent for the result, requiring another barrel shifter. In total, around 500 LUTs may be required to perform this calculation in floating point format.

In contrast, the calculation performed using a fixed point adder requires considerably fewer hardware resources. For example, a fixed point adder combining two 24-bit inputs would require 24 look-up tables (LUTs). Alternatively, a fixed point adder combining two 32-bit inputs typically requires 32 LUTs.

Therefore, it is apparent that the use of fixed point calculations translates into a significant reduction in silicon area for a given number of functions implemented on-chip. Consequently, many types of stream processor, for example those based around field-programmable gate arrays (FPGAs), are generally able to deliver more computational performance for fixed point (fixed range) numbers than for floating point. Since floating point arithmetic units require significantly more logic area on chip to implement than fixed point arithmetic units, more fixed point units can be implemented in parallel in the same silicon area. It is therefore beneficial to use fixed point data representations and fixed point calculations in order to achieve maximum performance.

Further, in many computational applications, the approximate range of the data is understood. Therefore, the extra number range provided by the floating point format (which may, for example, in IEEE 754 single precision format provide a range between $+/-10^{39}$) is unnecessary, and some of the available range is wasted. Consequently, for situations where the number range used is known, the fixed point format is more resource-efficient.

However, there are disadvantages to the use of the fixed-point data format which have, to date, prevented fixed-point numerical units from finding widespread use in iterative numerical computational hardware. Fixed point data, by its very nature, lacks range flexibility and may lead to errors in calculations. Two situations in which errors may occur are in the cases of underflow and overflow.

Underflow to zero occurs when a data value becomes too small to be represented differently from zero, and is rounded to zero. This leads to a loss of precision since small values that should still contribute to the result of the computation are lost. Underflow-to-zero has a negative effect on the accuracy of a computation that is related to the nature of the computation and the number of and significance of the data values lost—in general, it is advantageous to minimize underflow.

In contrast, overflow occurs when a data value becomes too large to be represented. In floating point, such a value will become infinite. However, in fixed point, unless special overflow detection is implemented, an invalid result will be produced. For example, if two large positive numbers are added, a negative result could be returned. Overflow is often catastrophic, introducing completely incorrect values into the computation that lead to the result of a computation being worthless.

Both underflow and overflow are more important issues for fixed point computation having a particular bit-width than for floating point computation. This is because of the inherently smaller dynamic range supported by the number representation. Therefore, in order to make use of fixed point data in scientific computation, overflow must be prevented and underflow minimised. These objectives are generally opposed to each other; for example, although overflow can be prevented by moving bits from the least-significant part of the number to the most significant, providing "space" for the number to get larger, this will increase underflow.

To summarise, floating-point units require significant silicon area, and may provide unnecessarily large ranges and/or precision which are not required for the computational task. This is wasteful of valuable on-chip area. On the other hand, fixed-point units require less silicon area but lack numerical range flexibility. Thus, fixed-point units may be prone to generate errors in numerical calculations if the range limits are exceeded.

It is possible to provide dynamic scaling of input, output and intermediate values of a calculation. By this is meant that the range of fixed point values for a particular step or stage in the calculation can be elected in dependence upon the values of the input variables and the output variables. However, there is an on-chip cost to providing dynamic scaling in that a sufficient number of registers or hardware elements must be used to provide the required flexibility. Many of these will go unused in practice because the fixed point representation will only use a subset of the available bitwidth.

For many calculations, the likely scaling factor is generally known at any particular stage in a calculation. For example, for hardware optimised for a particular task (e.g. for processing an iterative calculation such as a convolution), the maximum values for a particular stage in a calculation are generally known. Therefore, the need for dynamic scaling of values is reduced and static scaling (or static shifts) can be used instead.

Static shifts require, by their very nature, fewer resources. As a result, they have considerable benefits in terms of hardware resource management. However, static shifts (i.e. the maximum value and number of bits thereof) must be selected carefully due to their fixed nature which cannot be altered once the stream processor is committed to hardware.

Consequently, the use of static shifts requires the range of numbers used in a computation to be known and understood at each stage in a calculation. However, the range of the numbers used in a computation can vary significantly between the input, the output and the intermediate stages of a calculation. Furthermore, it is common for inputs and outputs of a formula to have similar ranges, but for intermediate results to have quite different ranges. Equation 2 illustrates a simple example of this:

$$p' = \frac{p \times 1000 - 5}{1000} \quad \text{(Equation 2)}$$

In this case, the final result p' will have a similar (though not identical) range to the input p, assuming the value of p is large compared to $5/1000$. However, the intermediate value p×1000 will have a range a thousand times greater. If the same fixed point number format is used to represent p, p' and p×1000 then either the value p×1000 will overflow or the values of p and p' will be have to be represented less precisely since they are approximately 1000 times smaller (equivalent to approximately 9 bits).

For simple equations like the one above, there is a straightforward relationship between input range and intermediate value ranges. However, for more complex formulae the relationship can be non-obvious. For example, a convolution calculation is set out in Equation 3:

For $0 <= i <= N$: $y[i] = x[i-1] \times c1 + x[i] \times c2 + x[i+1] \times c3$ (Equation 3)

The range (and most importantly, largest value) of y[i] depends not just on largest value in x but also on how the different values of x relate to each other (since y is computed from a combination of these values). Commonly convolutions might be used to compute derivatives, and the maximum value is related to the rate of change of the input values rather than directly to the values of the inputs themselves.

Therefore, whilst it may be possible to optimise fixed point types in a calculation for a particular dataset, this optimised data path may not produce the correct results when utilised with a dataset having different properties. Consequently, whilst automatic optimisations can be used to provide a fixed point data path having certain properties, such optimisation may not necessarily lead to a useable computation structure unless care is taken.

The example illustrated in FIG. 3 is a simple graph comprising a limited number of data paths, with each data path comprising only a small number of nodes and edges. Therefore, in principle, the above optimisation issues may be addressed manually for such a simple structure.

However, the number of data paths on a typical FPGA is around 10, and each data path may comprise a multiplicity of parallel branches which include, in total, typically $10^2$ to $10^5$ computation elements. This enables massively parallel calculations to be performed. Consequently, it is simply not possible to optimise manually outputs from all nodes forming intermediate steps in a typical parallel processor in order to address optimisation problems as set out above.

It is known to provide automatic conversion of floating point programs to fixed point. In general, known arrangements concentrate on automatically calculating fixed point types based on user-specified error constraints.

"Automatic conversion of floating point MATLAB programs into fixed point FPGA based hardware design" Banerjee, P.; Bagchi, D.; Haldar, M.; Nayak, A.; Kim, V.; Uribe, R. 11th Annual IEEE Symposium on Field-Programmable Custom Computing Machines, 2003. IEEE relates to an approach where value ranges are automatically propagated forwards then backwards in a simplified MATLAB program to compute appropriate types.

"FRIDGE: a fixed-point design and simulation environment" Keding, H.; Willems, M.; Coors, M.; Meyr, H. In Proceedings Design, Automation and Test in Europe (DATE), 1998. IEEE relates to a configuration which transforms floating point programs written in ANSI C into a fixed point specification and assigns a tuple of (word-length, integer-bits, sign) to each operand.

"An automatic word length determination method" Cantin, M.-A.; Savaria, Y.; Prodanos, D.; Lavoie, P, 2001 IEEE International Symposium on Circuits and Systems, 2001. ISCAS 2001. IEEE relates to a method which finds fixed point types. This is done by computing the differences between floating point and fixed point versions by simulating the data path and finding a set of word lengths where the differences meet a criterion set by the user.

"Wordlength optimization for linear digital signal processing" Constantinides, G. A.; Cheung, P. Y. K.; Luk, W., IEEE Transactions on Computer-Aided Design of Integrated Circuits and Systems, volume 22 issue 10, IEEE relates to an approach which concentrates on determining the optimum fixed point word lengths for variables in a DSP data path under error constraints.

Therefore, to date, known methods and associated hardware have suffered from the technical problem that they are unable to determine appropriate scaling factors, maximum values and rounding methods for each stage of a calculation in dependence upon user-determined parameters in order to provide a user-selected balance between consumption of on-chip resources and providing sufficient precision and/or accuracy in a parallel calculation on a stream processor.

According to a first aspect of the present invention, there is provided a method of generating a hardware design for a pipelined parallel stream processor, the method comprising: defining, on a computing device, a processing operation designating processes to be implemented in hardware as part of said pipelined parallel stream processor; specifying, on a computing device, at least one propagation rule for said processing operation; defining, on a computing device, a graph representing said processing operation as a parallel structure in the time domain, said graph comprising at least one data path to be implemented as a hardware design for said pipelined parallel stream processor and comprising a plurality of parallel branches configured to enable data values to be streamed therethrough, the or each data path being represented as comprising: at least one data path input; at least one data path output; and at least one discrete object corresponding directly to a hardware element to be implemented in hardware as part of said pipelined parallel stream processor, the or each discrete object comprising an input for receiving at least one input variable represented in a fixed point format; an operator for executing a function on said input variable or variables; and at least one output for outputting an output variable represented in a fixed point format; optimising, on a computing device, the number of bits, the offset, the number format and the rounding mode for each output from each discrete object in dependence upon the specified propagation rule or rules to produce an optimised graph; and utilising, on a computing device, said optimised graph to define an optimised hardware design for implementation in hardware as said pipelined parallel stream processor.

The present invention relates to a method for optimising the streaming calculation hardware structure such that each node in a calculation (of which there may be many thousands) can provide sufficient precision and have an appropriate range (or scaling) whilst minimising the hardware required.

By providing such a method, fixed point processing logic can be utilised to provide streaming data paths in which calculations are performed with sufficient precision whilst still providing the advantage of a significantly reduced logic area to perform the calculations in fixed point.

For example, the programmer might use a bitwidth limit of 24 bits to ensure optimal multiplier resource usage on Xilinx FPGAs (which contain 18 bit x 25 bit multipliers), and then the compiler will automatically generate the best hardware it can under that constraint. The programmer can further optimize the result quality with manual typing at critical regions should this be desired.

The present invention comprises an arrangement whereby the code that needs to be written to apply variable types to a data path can be minimised. Rules that the programmer might have applied by hand can be automatically propagated through the nodes created to enable calculations to be performed on a stream processor. Further, the present invention allows the programmer to select the most appropriate set of rules to use for each region of the design.

In one embodiment, said processing operation comprises a mathematical function or calculation to be implemented in hardware as said pipelined parallel stream processor.

In one embodiment, the or each hardware element comprises one or more hardware units on said pipelined parallel stream processor.

In one embodiment, the or each hardware element is configured to carry out a predetermined mathematical function.

In one embodiment, the or each propagation rule comprises at least one rule selected from the group of: maximum allowable bit size for the output from the or each discrete element; the desired offset of the output from the or each discrete element; and the rounding mode used by the or each element to produce an output or outputs therefrom.

In one embodiment, the or each propagation rule comprises at least one rule selected from the group of: maximum allowable bit size for the output from the or each discrete element; the desired offset of the output from the or each discrete element; the number format of the output from the or each discrete element; and the rounding mode used by the or each element to produce an output or outputs therefrom.

In one embodiment, the or each maximum allowable bit size rule is selected from the group of: the full number of bits generated in a calculation in said discrete element; from the largest of the number of bits in the or each input to a discrete element; a specified maximum value; and a specified exact value.

In one embodiment, the or each offset rule is selected such that: overflow is prevented; underflow is prevented; the offset is set to the maximum value of the input or inputs to the or each discrete object; or the offset is set to a predetermined value.

In one embodiment, the rounding mode rule is selected from the group of: round to zero; round to positive infinity; round to negative infinity; round to nearest value; and round to nearest value with ties to even.

In one embodiment, the rounding mode is specified manually in the or each propagation rule or is selected automatically in dependence upon a specified parameter.

In one embodiment, the rounding mode is selected automatically in dependence upon the number of bits rounded off in an output from the or each discrete element.

In one embodiment, the number format for each output variable is selected from the group of: unsigned; twos complement; and sign-magnitude.

In one embodiment, the number format is selected automatically in dependence upon the or each propagation rule.

In one embodiment, a plurality of propagation rules are specified for said processing operation.

In one embodiment, said processing operation comprises a plurality of data expressions, one or more propagation rules being specified for each data expression.

In one embodiment, the or each propagation rule is stored in a stack such that the most recent propagation rule is active for subsequent data expressions in said processing operation.

In one embodiment, said graph comprises multiple inputs and multiple outputs, each input and each output being connected to at least one branch of said at least one data path.

In one embodiment, said graph comprises multiple parallel data paths to be implemented in hardware as said pipelined parallel stream processor, and said step of optimising is carried out for each of said multiple parallel data paths.

In one embodiment, said stream processor is implemented on a Field Programmable Gate Array or an Application Specific Integrated Circuit.

In one embodiment, the method further comprises the step of forming said optimised hardware design on said stream processor such that said stream processor is operable to perform said processing operation.

According to a second aspect of the present invention, there is provided a method of making a programmable logic device, comprising: generating a design using the method of the first aspect; and programming the logic device to embody the generated design.

According to a third aspect of the present invention, there is provided a computer program arranged, when run on a computer to execute the steps of the first or second aspects.

According to a fourth aspect of the present invention, there is provided a method according to the first or second aspects stored on a computer-readable medium.

According to a fifth aspect of the present invention, there is provided a Field Programmable Gate Array, Application Specific Integrated Circuit or other programmable logic device, having a design generated using method of the first aspect.

According to a sixth aspect of the present invention, there is provided a system for generating a hardware stream processor design, the system comprising: a processor arranged to execute the method of the first aspect and to generate a list of instructions for the programming of a programmable logic device having the generated design.

According to a seventh aspect of the present invention, there is provided a computer program product executable by a programmable processing apparatus, comprising one or more software portions for performing the steps of the first to sixth aspects.

According to a eighth aspect of the present invention, there is provided a computer usable storage medium having a computer program product according to the seventh aspect stored thereon.

BRIEF DESCRIPTION OF THE DRAWINGS

Embodiments of the present invention will now be described in detail with reference to the accompanying drawings, in which:

FIG. 1 is a schematic diagram of an FPGA device;

FIG. 2 is a schematic diagram showing a programmable logic block forming part of the FPGA based stream processor of FIG. 1;

DETAILED DESCRIPTION OF THE EMBODIMENTS

A typical FPGA 10 will comprise a number of discrete data paths. The number of data paths on a typical FPGA is typically around 10 or less. However, each data path may comprise a multiplicity of parallel branches which comprise, in total typically $10^2$ to $10^5$ computation elements. This enables massively parallel calculations to be performed.

A graph is a representation of a desired processing operation (e.g. mathematical calculations such as convolutions) to be implemented in hardware as part of a stream processor. A graph describes an algorithm or processing operation as a parallel structure in the time domain using a data path to represent the desired algorithm. The or each data path on a graph is represented as a function of clock cycles, with data "flowing" along a data path from the input(s) to the output(s) with increasing clock cycle.

A data path comprises discrete objects (or nodes) which perform processing operations on the streamed data. The discrete objects correspond directly to hardware elements to be implemented as part of a stream processor on the FPGA such as arithmetic units or compute units. Hardware elements may comprise one or more hardware units (such as CLBs) on the physical FPGA. The nodes are connected by edges which carry variables or numerical values between nodes. A complete graph may comprise many thousands of nodes and edges.

In other words, nodes represent operations and edges show where the output of each operation feeds into the input of another. Both nodes and edges may have attributes; for example nodes may have particular properties such as an associated latency. Additionally, edges may have an associated direction.

Figure 3:
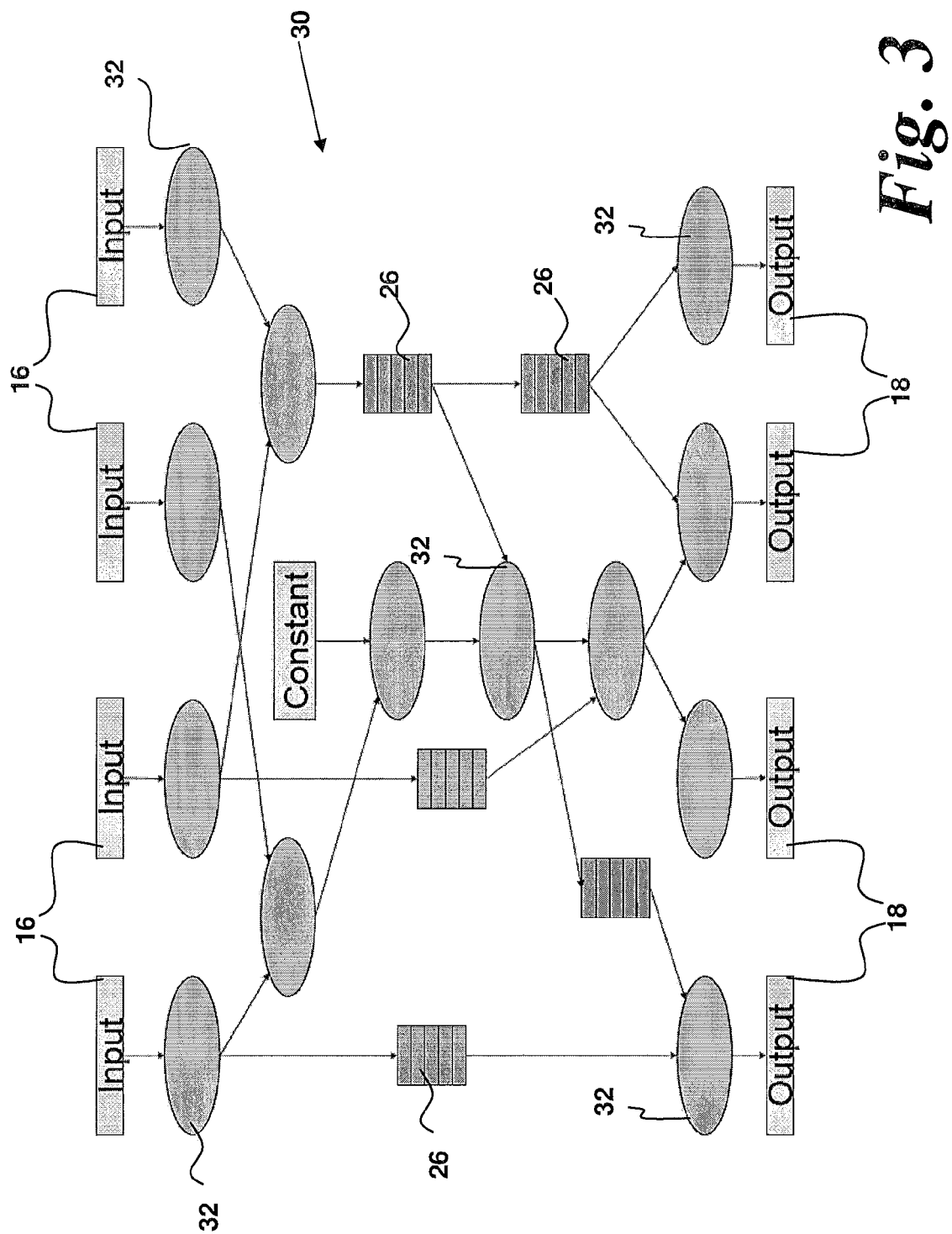
FIG. 3 is a schematic diagram of an example of a possible computation structure for an FPGA-based stream accelerator.
Figure 4:
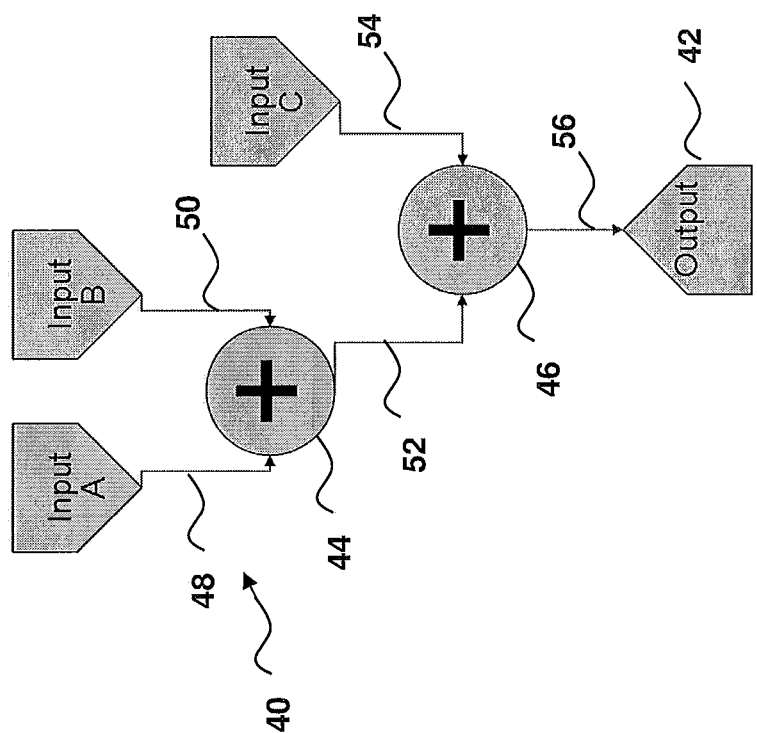
FIG. 4 shows an example of a graph illustrating a simple data path.

An example of a graph defining a simple streaming data path is shown in FIG. 4. FIG. 4 shows a simple three input (A, B and C) data path 40 having a single output 42. The data path 40 comprises a pair of nodes 44, 46. In this example, the nodes 44, 46 comprise adders. The nodes 44, 46 are connected between the inputs and output by means of edges 48, 50, 52, 54, 56 (or interconnects) between the inputs A, B, C, nodes 44, 46 and output 42.

As shown in FIG. 4, the nodes 44, 46 and edges 48, 50, 52, 54, 56 define a plurality of branches within the data path 40. In general, a data path represents a particular process operation or function and is implemented as a pipelined circuit through which the data flows. A kernel may also comprise a plurality of branches (also called control paths) which do not compute directly on the data but may configure the data path at different points in time to change its function. These branches may be dependent upon other branches, or may be independent or semi-independent depending upon the nature of the bulk computation performed by a particular data path.

However, whilst for clarity the term data path corresponds to a kernel, it is within the scope of the invention for a data path to be split across more than one kernel. The scope of the terms defined herein will be readily apparent to one skilled in the art.

In many calculations, the numerical range and/or number of bits used may vary for each node of the calculation. For example, the input A may comprise a 24-bit fixed point number (which is passed along edge 48 to node 44) whereas input B may comprise a 32-bit number (which is passed along edge 50 to node 44).

In addition, each input variable may have very different maximum values (which will determine the scaling factor for each fixed point value). Therefore, the node 44 will receive particular input values having particular precisions and particular maximum values. The calculation (in this case an addition) will then take place in node 44 and the result output as an output on edge 52. The output from node 44 along edge 52 will then form an input to node 46.

The precision and/or numerical range of the output variable from node 44 could be any desired fixed point value. For example, if it is known that only low precision is required, then the output variable may be output with a lower precision (e.g. 16-bit) than the inputs from edges 48 and 50. Alternatively, if high precision is required, then a greater number of bits may be used.

Further, given that the inputted and outputted variables are in fixed point format, there is a need to consider the maximum values (which will determine the scaling factor or offset thereof) of the inputs along edges 48 and 50 and the required maximum value (which will determine the scaling factor or offset) of the output from node 44 along edge 52. The scaling factor (selected to minimise underflow and prevent overflow) in combination with the number of bits will determine the precision of the output variable on edge 52.

As a result, the hardware associated with node 44 will need to be arranged to perform the resulting calculation without risk of overflow or underflow, and to a sufficient degree of precision as required by the particular calculation.

However, an increase in the required precision will also lead to an increased consumption of hardware units on the FPGA. Therefore, use of excessive and unnecessary precision in the output value from node 44 will require additional hardware units without an additional quality benefit. Consequently, the precision, type and format of the fixed point output from the node 44 must be selected carefully in dependence upon the requirements of the calculation in order to utilise optimally the available hardware resources.

As described above, an automatically optimised graph in which fixed point units are used instead of floating point units will often be inadequate for use across a range of inputted values. Further, production of such a graph manually is not possible given the large number of nodes in a typical stream processor.

The present invention provides an arrangement which enables optimisation of a hardware configuration for a fixed point calculation without relying on the error-prone method of relying on a particular data set to test and refine the number representation. A user specifies a few known maximum values and then types are conservatively calculated from those maximums. If the user wishes to optimize further for a particular data set, this can be done with further annotations to the code.

When generating a fixed point data path, the present invention provides for the specification of types for each operation on a per-operation basis. Every variable (edge in the dataflow graph) has a type. In some cases this type is specified by the user manually, in other cases it is determined automatically by the compiler. Types can be generated as a function of the input types (i.e. the type of the input variables) and one or more user-specified type propagation rules. Thus, optimised fixed point types can be automatically determined without the user needing to specify types for each and every variable, but with flexibility for the user to determine some general properties of the data path.

Each type has a type descriptor. The type descriptor enables a generalised description of fixed range numbers that do not intersect the radix point. This eliminates the need for the data to be separately scaled. In the method of the present invention, fixed point number types are described by the following meta-data:

1. A bitwidth, i.e. the number of bits that should be used to represent the variable;
2. A maximum value i.e. the maximum value that the fixed point number must be able to hold; and
3. A sign mode, i.e. how the bits should be interpreted as a positive or negative number.

In actual hardware, the maximum value is used to determine an 'offset' or shift. The offset is the position of the rightmost bit of the number relative to the radix point and can be thought of as a scaling factor where the scaling factor is a power of two (i.e. a shift). For example, consider the following bit patterns (where the thick separator line indicates the position of the radix point, and X indicates a digit position that exists within the number i.e. could be 1 or 0), as shown in Table 1.

TABLE 1

| Bitwidth | Offset | | | | | | | | |
|---|---|---|---|---|---|---|---|---|---|
| 3 | 0 | | | | X | X | X | | |
| 3 | −2 | | | | | X | X | X | |
| 4 | −3 | | | | | X | X | X | X |
| 3 | 1 | X | X | X | | | | | |
| 3 | −4 | | | | | | X | X | X |

The number is interpreted as (number stored in binary*$2^{offset}$). Notice that the binary bits that are actually stored do not need to intersect the radix point, thus very small or very large numbers can be represented with limited precision without needing to store additional bits simply to express the offset from the radix point.

The sign mode could, for example, be UNSIGNED, TWOSCOMPLEMENT or SIGNMAGNITUDE. This affects the maximum value that a number can hold, and thus the translation from maximum to offset.

UNSIGNED is used when the sign of the variable is known and so does not need to be included in the binary number representation of the variable.

TWOSCOMPLEMENT is a well known number format which is asymmetric around zero. In this system, negative numbers are represented by the two's complement of the absolute value. This is determined as the value obtained by subtracting the number from a large power of two (specifically, from $2^N$ for an N-bit two's complement).

SIGNMAGNITUDE is a format where the sign of the number is encoded into a sign bit at the head (or tail) of the binary number (e.g. sign and magnitude).

By way of example, take the first example from table 1) above which has a bitwidth of 3, and an offset of 0. The maximum value that this variable can hold is 7 as an UNSIGNED number, or 3 as a TWOSCOMPLEMENT or SIGNMAGNITUDE number.

Maximum values refer to the maximum positive or negative number, not the absolute maximum (which is 4 in the example above). This is significant because TWOSCOMPLEMENT number representation is asymmetric around zero, i.e a 3-bit twos complement number represents the number range −8 to +7.

We observe that in numerical calculations values are generally symmetric around zero so we only store a single maximum value and require that the number represents that in both positive and negative directions (i.e. max 4=the number must be able to represent +4 and −4).

The sign mode is generally selected automatically for each stage of the calculation. The sign mode of an output variable may be a function of the sign mode of the input variable or variables. For example, consider a calculation where one input variable is an UNSIGNED number and another input variable is a TWOSCOMPLEMENT number. In this case the output from the calculation will be a TWOSCOMPLEMENT number.

Generally, the sign mode may be automatically selected to optimise the use of system resources for a particular stage in the calculation as will be described later. However, the sign mode may optionally be selected manually should the user wish to do so for a particular stage of a calculation.

The value of the maximum for a particular output from a node is stored as meta-data rather than an offset. An offset can then be computed from the maximum. This configuration is used because each combination of maximum and type mode will map only to one offset value.

By storing the maximum value it is possible to compute types more optimally than using an offset alone. This is because the use of an offset alone is generally conservative with regard to maximum values. For example, take an UNSIGNED integer number with maximum value of 4. Through use of an offset, this will lead to a number representation having a bitwidth of 3 and an offset of 0. However, this configuration could actually represent a number up to the value of 7.

The specified terms can be expressed in code terminology to enable a user to specify particular terms or conditions on the type. Many different formats could be used and the format used herein is used merely as an example and is not to be construed as limiting. A typical format for a line of code may be, for example, as set out in code line 1 (CL1):

*hw*FixMax(bitlength,maximum value,sign mode)    (CL1)

So, by way of example, code line 2 (CL2):

*hw*FixMax(24,1.0,TWOSCOMPLEMENT)    (CL2)

which corresponds to a variable having 24 bits with a maximum value of 1.0. Therefore, the offset will be −22 bits.

Alternatively, the offset could be specified if required, as set out in code line 3 (CL3):

$$hwFixOffset(Bitwidth, Offset, sign\ mode) \quad (CL3)$$

And an example is given below in code line 4 (CL4):

$$hwFixOffset(24,-22,TWOSCOMPLEMENT) \quad (CL4)$$

which corresponds to a variable having 24 bits and a maximum value of 1.99999976.

As shown in (CL4), when a variable is described using the offset, the implied maximum is greater than 1.0 which could, as set out above, lead to inefficiencies in the automatic calculation of result types from operations.

The relationship between maximum and offset is that, for twos complement numbers is shown in Equation 4:

$$\text{Maximum value} = (2^{bitwidth-1}-1) \times 2^{offset} \quad \text{(Equation 4)}$$

And the same relationship for sign-magnitude numbers is shown in Equation 5:

$$\text{Maximum value} = (2^{bitwidth-1}-1) \times 2^{offset} \quad \text{(Equation 5)}$$

This is the same as for Equation 4, because two's complement numbers and sign-magnitude numbers can both represent the same largest positive number.

And the relationship for unsigned numbers is shown in equation Equation 6:

$$\text{Maximum value} = (2^{bitwidth}-1) \times 2^{offset} \quad \text{(Equation 6)}$$

Many operations on arbitrary fixed point numbers can lead to many more output bits than are present in the inputs. Consider for example, code line 5 (CL5) below:

$$hwFixMax(12,65520,UNSIGNED) \times hwFixMax(12, 0.24994,UNSIGNED) \quad (CL5)$$

which is equivalent to code line 6 (CL6):

$$hwFixOffset(12,4,UNSIGNED) + hwFixOffset(12,-14, UNSIGNED) \quad (CL6)$$

These two numbers are disjoint. The full set of output bits have a maximum of 65520.2499 and are set out in code line 7 (CL7):

$$hwFixOffset(30,-14,UNSIGNED) \quad (CL7)$$

There are 30 bits in the output, compared to only 12 bits in each of the two inputs.

One approach to this is to require the user to specify manually the result type from each operation, either as part of the operation, or by explicitly casting the result to a new type.

In the present invention, the method is operable to determine automatically the output type from each operation but, additionally, to maintain flexibility by performing this according to user-determined rules.

In one mode of operation, the compiler requires that the two input types of each binary operation (addition, multiplication, etc) are the same, and generates the same output type as result. For example, code line 8 (CL8):

$$hwFixOffset(16,-14,UNSIGNED) + hwFixOffset(16,-14,UNSIGNED) = hwFixOffset(16,-14,UNSIGNED) \quad (CL8)$$

In an alternative, more complex, mode of operation, the compiler computes the bitwidth and offset of the result type based on the input types and the type propagation rules. In this mode, the rules for determining bitwidth can be selected by the user from the following group:

1. bitSizeAll: Set the number of output bits to the full number of bits generated by the computation, e.g if a 16 bit number is multiplied with a 24 bit number, the result will be 40 bit.
2. bitSizeLargest: Set the number of output bits to the largest of the number of bits in the inputs to a node, e.g if an 18 bit number is multiplied with a 24 bit number, the result will be 24 bit.
3. bitSizeLimit(N): Set the number of output bits to the full number of bits generated by the computation, or N, whichever is the smallest. For example, if N is 50 bits, a 16 bit number multiplied by a 24 bit number will return 40 bits. If N is 30 the computation will return 30 bits.
4. bitSizeExact(N): Regardless of the computation inputs, return an output with Nbits.

Then, the rules for determining the offset based on the maximum values in the two inputs are:

1. offsetNoOverflow: Set the offset of the return type such that the upper bits are guaranteed to be represented and there is no possibility of overflow.
2. offsetNoUnderflow: Set the offset of the return type such that the lower bits are guaranteed to be represented and there is no possibility of underflow.
3. offsetLargestMax: Set the offset so the return type has the an offset sufficient to represent the largest input value.
4. offsetExact(N): Set the offset of the return type to N Types are then calculated based on the pair of a bitwidth rule and offset rule. These rules can be configured independently of each type of operation (add, subtract, multiply, divide) and can be different at different locations in the design. The sign mode will, in general, also be calculated based on these rules.

For example (bitSizeAll, offsetNoOverflow) and (bitSizeAll, offsetNoUnderflow) will both lead to the full set of output bits being returned.

A common choice of rule is (bitSizeLimit(N)), (offsetNoOverflow). This rule can be used to ensure that no operation overflows, but prevents bitwidths growing out of control from each operation.

Therefore, the present invention enables a user to decide on the physical bit pattern used to represent a number based on its offset. However, the output type of an operation is computed using the maximum value. The maximum value can be less conservative than the offset, thus ensuring a more optimal output type is generated. The optimal output type potentially utilises fewer bits than would be generated using purely the offset, and so can save on hardware consumption. Even a reduction in one or two bits per node (or operand) can, when carried across many thousands of nodes, result in significant on-chip hardware resource savings.

For example, to represent X=4.0 as an UNSIGNED number with offset zero requires 3 bits, the value could be represented as shown in code line 9 (CL9) or as shown in code line 10 (CL10):

$$hwFixMax(3,4.0,UNSIGNED) \quad (CL9)$$

Or $$hwFixOffset(3,0,UNSIGNED) \quad (CL10)$$

To compute the output type of X*X using (offsetNoOverflow, bitSizeAll) produces different types depending on whether max or offset is used as shown in code line 11 (CL11) and code line 12 (CL12):

$$hwFixOffset(3,0,UNSIGNED) * hwFixOffset(3,0,UNSIGNED) = hwFixOffset(6,0,UNSIGNED) \quad (CL11)$$

hwFixMax(3,4.0,UNSIGNED)*hwFixMax(3,4.0,UN-
SIGNED)=hwFixMax(5,16.0,UNSIGNED)    (CL12)

Note that when the maximum value was used to calculate the output result type, only a 5-bit result was generated instead of a 6-bit result when the offset was used.

This is particularly important when, for example, adding together many numbers: a+b+c+d+e.

Typically fixed point numbers are described in terms of integer bits (to the left of the radix point) and fraction bits (to the right of the radix point). However a number that is very large but imprecisely known may need a large number of integer bits in order to represent it since its value is a long way left of the radix point. Consider for example these three numbers as set out in Table 2 below:

TABLE 2

| Binary | | | | | | | Decimal |
|---|---|---|---|---|---|---|---|
| 1 | 0 | 0 | 0 | 0 | 0 | 0 | 64 |
| 1 | 1 | 0 | 0 | 0 | 0 | 0 | 96 |
| 1 | 0 | 0 | 0 | 0 | 0 | 1 | 65 |

For each case there are only 2 bits set out of the total of six 6 bits present in each number. However, in the first and second cases the majority of the bits are being used only to represent the distance of the set bits from the radix point. The same issue can occur with small numbers, which may never approach 1.0, and many bits may be used simply to express that the number is very small.

In general, this is resolved by scaling the number (i.e. multiplying it by a scaling factor) in order to keep the number close to the radix point. When the scaling factor is a power of two this is known as a shift. In the present invention, only the minimum number of bits are required and the offset of the number communicates the scale.

Our invention allows the programmer to select different propagation rules for different parts of the calculation, depending on the precision requirements of those components.

For example, in the user program code line 13 (CL13) and code line 14 (CL14):

HWVar x=io.input("x",hwFixMax(24,1.0,
    TWOSCOMPLEMENT));

HWVar y=io.input("y",hwFixMax(18,1.0,
    TWOSCOMPLEMENT));    (CL13)

optimization.pushFixOpMode(Optimization.
    bitSizeLargest( ), Optimization.offsetNoOver-
    flow( )));

HWVar z=x*y;    (CL14)

The type of the operation x*y is automatically determined by the compiler.

In practice, if all the input numbers have the same type, then a conservative computation of the output type for each operation will assume that each addition operation could grow one bit to the left. However, by tracking the actual maximum value that could have resulted from the computation, it is clear that some operations would not grow bits and the final result type can be correspondingly smaller and more efficient in hardware.

In the output of many operations, the number of bits is necessarily reduced. However, in some cases, this may lead to rounding of the number being necessary. For example, consider a fixed point number with 4 bits to the right of the radix point being converted to a number with only 2 bits to the right of the radix point as set out in Table 3:

TABLE 3

| | Binary | | | | | | Decimal | Error |
|---|---|---|---|---|---|---|---|---|
| Original | 0 | 0 | 1 | 1 | 0 | 1 | 1 | 1.6875 | — |
| Truncated | 0 | 0 | 1 | 1 | 0 | | | 1.5 | 0.1875 |
| Rounded | 0 | 0 | 1 | 1 | 1 | | | 1.75 | 0.0625 |

When the bits are simply removed ("truncated"), there may be higher error introduced compared to performing rounding. A number of different rounding schemes are available, and a non-exhaustive list of these may include:

1. Round to zero (truncation).

In this approach, the bits are simply removed without regard to their value.

2. Round to positive infinity

This approach simply rounds up the least significant bit.

3. Round to negative infinity

The opposite of option 2, this approach simply rounds down the least significant bit.

4. Round to nearest (TONEAR)

This approach rounds the least significant bit to the nearest value to the original number, e.g. in decimal 1.0-1.49 will round to 1, whereas 1.5-1.99 will round to 2. In other words, round-to-nearest simply adds the first bit rounded away to the lowest bit position of the new number. This minimizes the error introduced by the bit removal operation.

5. Round to nearest ties to even (TONEAREVEN) This approach is similar to option 4), however it has important differences. Option 4) potentially introduces a bias because there is one bit pattern that represents the exact half way point between two numbers, and under round-to-nearest this will always round up. Over numerous iterations, such a bias can lead to a significant deviation of the numerical values.

Round to nearest ties to even addresses this potential bias by introducing a specific rule for the half way point case, that it always rounds towards an even number. Assuming inputs are evenly distributed this means 50% of these values round up and 50% round down, eliminating the bias.

For example, consider these two cases in Table 4:

TABLE 4

| | Binary | | | | | | | Decimal | Error |
|---|---|---|---|---|---|---|---|---|---|
| Original 1 | 0 | 0 | 1 | 1 | 0 | 1 | 0 | 1.625 | |
| Round-to-near | 0 | 0 | 1 | 1 | 1 | | | 1.75 | 0.125 |
| Round-to-near ties to even | 0 | 0 | 1 | 1 | 0 | | | 1.5 | 0.125 |
| Original 2 | 0 | 0 | 1 | 1 | 1 | 1 | 0 | 1.875 | |
| Round-to-near | 0 | 1 | 0 | 0 | 0 | | | 2.0 | 0.125 |
| Round-to-near ties to even | 0 | 1 | 0 | 0 | 0 | | | 2.0 | 0.125 |

In both cases, the error introduced by round-to-near and round-to-near ties to even is the same, but in one case the ties to even case rounds up and in one case it rounds down.

In general, it is preferred to use ties-to-even due to the lack of bias. However, greater hardware resources are required on-chip in order to round ties-to-even because this additional rule must be checked in hardware at every rounding operation.

The impact of ties to even is more significant as the number of bits being rounded away gets smaller. This is because there is 1 half-way bit pattern out of $2^N$ bit patterns where N bits are being rounded away, and so the proportion of cases rounded with bias is ($\frac{1}{2} \times 2^{-N}$)—something that gets smaller as N increases.

Our invention addresses this problem by allowing the programmer to select different rounding modes for different parts of the calculation, depending on the sensitivity of those components to bias, and to set rules for automatically selecting rounding mode based on how many bits are rounded away.

TONEAREVEN (i.e. round to nearest ties to even) rounding mode gives results with lower bias than TONEAR (i.e. round to nearest), however consumes more on-chip area. Since the impact of TONEAREVEN grows as the number of bits being rounded away gets smaller, it is possible to select between the two different rounding modes depending on how many bits are being rounded away.

This can be done based on a threshold value N. When fewer than N bits are being rounded away, TONEAREVEN is used, when more than N bits are being rounded away, TONEAR is used. The value of N can be adjusted by the user depending on the requirements of the application.

Figure 5:
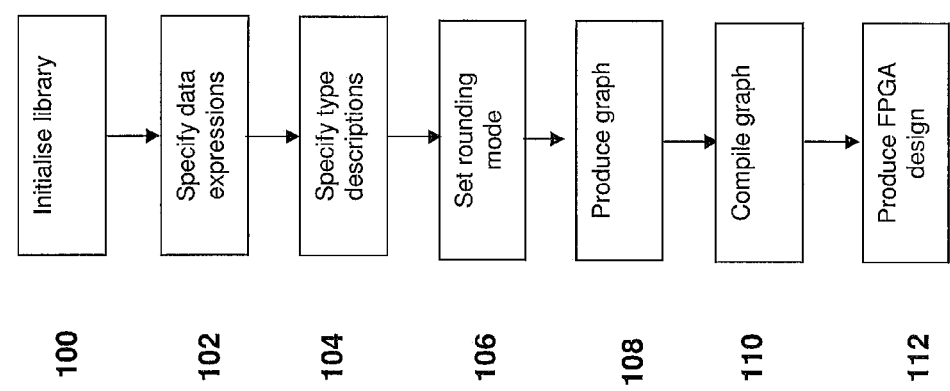
FIG. 5 shows a flow chart of a method according to an embodiment.

An implementation of the present invention will now be described with reference to FIGS. 5 and 6.

Step 100: Initialise Library

Figure 6:
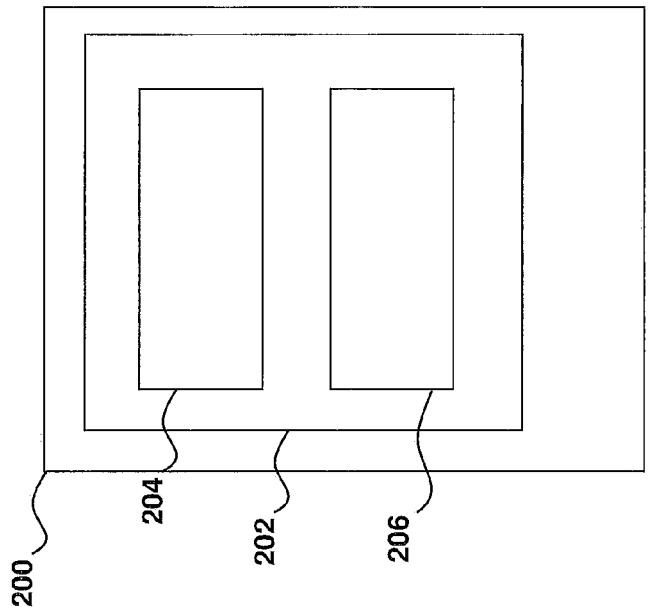
FIG. 6 shows a schematic of an application for carrying out the method of FIG. 5.

The method of the present invention can be run on a standard computing apparatus 200 as shown in FIG. 6 or other programmed or programmable apparatus running an operating system such as Windows or Linux.

In this embodiment, the method is implemented as application 202 (FIG. 6) which utilises a Java library 204. However, other languages may be used and these will be apparent to the skilled person. For example, the application could be run in C, C++ or any other suitable programming language.

The application 202 has a graphical user interface (GUI) 206 which enables a use of the computing apparatus 200 to enter commands and access the application.

At step 100, the application and Java library is initialised. The method then proceeds to step 102.

Step 102: Specify Data Expressions

Through the GUI 206, the user specifies the desired data flow as expressions. These may comprise commands such as (a+b)+c. As an example, the user may wish to process a typical 2D cross convolution as defined in code line 15 (CL15) below:

$$o = c*(i[-nx]+i[-1]+i+i[1]+i[nx])\qquad\qquad(CL15)$$

where o is the output, i is the input and nx is the variable size of the fast dimension in the dataset.

The expression in (CL15) will, once the method progresses, be converted into a sequence of nodes and edges by the complier. Once these commands and expressions have been entered, the method proceeds to step 104.

Step 104: Specify Type Descriptions

For each data expression as set out above (and exemplified by (CL15)), a type description (or propagation rule) is specified for the optimisation. The type description is set above a particular data expression and the type modes are then carried through the optimisation so that the generated nodes are allocated type modes by the compiler.

Type descriptions are placed such that, in use, the type modes derived therefrom are allocated to a global stack. The code enables new modes to be "pushed" on top, then "popped" back off again as required. The mode at the top of the stack is the one in operation at any particular line. A node that is created on a particular line of code will then pick up the type mode that is in effect at that line.

The type description may be as set out below in code lines 16 to 25 (CL16-CL25) below:

```
(CL16)    HWVar a, b, c, d, e, etc ..
(CL17)    c = a + b
(CL18)    Optimization.pushFixOpModes(Optimization.bitSizeLimit(24)),
          Optimization.offsetNoOverflow( ), MathOps.ALL);
(CL19)       d = c + a
(CL20)       e = d x d
(CL21)       optimization.pushFixOpModes(Optimization.bitSizeExact
             (32),
          Optimization.offsetExact(0), MathOps.ALL);
(CL22)    h = e * f * g + d/1000
(CL23)    optimization.popFixOpModes(MathOps.ALL)
(CL24)    i = h + h
(CL25)    optimization.popFixOpModes (MathOps.ALL)
```

The above will now be explained in more detail. At (CL16) the variables to be used and implemented in hardware are defined. At (CL17), a straightforward addition is specified. No type description precedes this line of code and so the nodes generated by the compiler as a result of processing (CL17) will take the propagation rule currently at the head of the stack or, if no type description is allocated, a default or the default values of the variables in the calculation.

At (CL18) type descriptions are specified for the optimisation. In this case, nodes generated to implement the data paths for the equations of (CL19) and (CL20) will take the type descriptions specified in (CL18). In other words, the nodes generated to express (CL19) and (CL20) will have a bit size limit of 24 bits and the offset for the outputs of the nodes of this calculation will be set to prevent overflow.

However, a different type description is set (or "pushed" at (CL21)). This will specify that any nodes generated by subsequent data expressions will have a bit size limit of 32 and an offset of exactly 0. The equation specified at (CL22), then, will take these parameters and any nodes and edges subsequently generated will be generated with these parameters specified.

At (CL23) a removal or "pop" operation is specified which removes the most recently specified type description (e.g. that at CL21) from the top of the stack and so the next expression (at CL24) will take the penultimate type description, i.e. the one specified at CL18).

At (CL25), another "pop" operation is specified and so the type description specified at CL18 will be removed and the type description now in force (i.e. at the top of the global stack) will be the one which applies to CL17).

The approach of the present invention enables the user to specify type descriptions for some or all of the nodes in a graph. The type descriptions can be added and removed as desired by reference to a global stack of type descriptions.

Step 104 may, in practice, be performed or set out at the same time as step 102, i.e. the two steps may comprise on process. Alternatively, they may be sequential with expressions being set out prior to their type descriptions being added to the code.

The method then proceeds to step 106.

Step 106: Set Rounding Mode

At step 106 a rounding mode is set for expressions or calculations. The rounding mode so specified will then be applied to the nodes and edges generated to represent the desired calculation in a streaming time domain format.

The rounding mode is specified as an expression in the same manner as for the type descriptions set out above. Take the code line 26 (CL26) example set out below:

optimization.pushRoundingMode(RoundingMo-
de.TONEAR)                                          (CL26)

This would be added prior to an expression such as (CL18) and specifies that the rounding mode to be used is to the nearest value (TONEAR). The rounding value can, thus, be set manually for each expression or line of code.

Alternatively, the rounding mode can be set automatically depending upon a specified parameter. Such a parameter may be, for example, the number of bits to be rounded off in a particular calculation. This is set by, for example, code line 27 (CL27):

optimization.pushRoundingMode(Rounding-
Mode.AUTOMATIC($T$))                                (CL27)

where T is the threshold value for the number of bits that are being removed to trigger switching between rounding modes. Take, for example, the following code set out in code line 28 through 33 (CL28-CL33):

(CL28) HWVar x = hwFixMax(N, 1.0, SignMode.TWOSCOMPLEMENT)
(CL29) HWVar y = hwFixMax(M, 1.0, SignMode.TWOSCOMPLEMENT)
(CL30) optimization.pushFixOpModes(Optimization.bitSizeLimit(P)
(CL31) Optimization.offsetNoOverflow( ), MathOps.ALL)
(CL32) optimization.pushRoundingMode(RoundingMode.Automatic(T))
(CL33) HWVar z = x * y To explain the above in more detail, (CL28) and (CL29) specify variable x and variable y respectively. Variable x is specified as having N bits, a maximum value of 1.0 and a TWOSCOMPLEMENT sign mode (as set out above). Variable y is specified as having M bits, a maximum value of 1.0 and a TWOSCOMPLEMENT sign mode (as set out above).

(CL30) specifies that the optimisation is to take place with a bitsize limit of P. (CL31) specifies that the optimisation has an offset value selected to ensure that there is no overflow. (CL32) specifies that the rounding mode is automatic and is selected based on the parameter T. In this instance, T corresponds to the number of bits rounded away. However, this need not be so and other parameters may be used. Finally, (CL33) specifies that the variable z is the result of a multiplication of x and y.

Therefore, if no bit size limit values (e.g. if the bitsize(All) parameter was used) were in place, then the resulting variable z of the operation x*y would comprise N+M bits. However, the optimisation mode specified in (CL30) will limit the number of bits of variable z to P bits. Therefore, assuming P<N+M, this mode will cause the removal of N+M−P bits from the variable z.

The rounding threshold is set to T bits, and so if N+M−P>T then the threshold is exceeded and a particular mode (for example, the TONEAR mode) is used. However, if N+M−P≤T then an alternative mode, such as to near ties to even (TONEAREVEN mode) could be used.

Step 106 may, in practice, be performed or set out at the same time as step 104 or 102, i.e. the three steps may comprise on process. Alternatively, they may be sequential with expressions being set out prior to their type descriptions being added to the code.

Once the rounding parameters have been specified, the method proceeds to step 108.

Step 108: Produce Graph

Once the commands have been entered at steps 102 to 106, the application 102 utilises the Java library 104 to produce a graph represented by Java objects.

The graph will comprise a plurality of data paths, each of which will comprise a plurality of nodes. Edges intersect the nodes and carry values between the nodes. For each input and output of a node, type modes are calculated by the compiler.

The method then proceeds to step 110.

Step 110: Compile Graph

Once the optimised schedule has been determined, the graph can be compiled into a format such that the physical FPGA can then be formed. Compilers and compilation methods are well known in the art and the skilled person would be readily aware of software, hardware and implementations that could be used with the present invention. The method then proceeds to step 112.

Step 112: Produce FPGA Design

Once the graph has been compiled into the correct format in step 110, the FPGA design for the stream processor is formed. The FPGA design can then, optionally, be used to implement the optimised data paths (or kernels) and data flow in hardware. Once the FPGA design has been formed in hardware on an FPGA chip or device, it can be used as required by the end user to perform the stream calculations defined in step 102.

Figure 7:
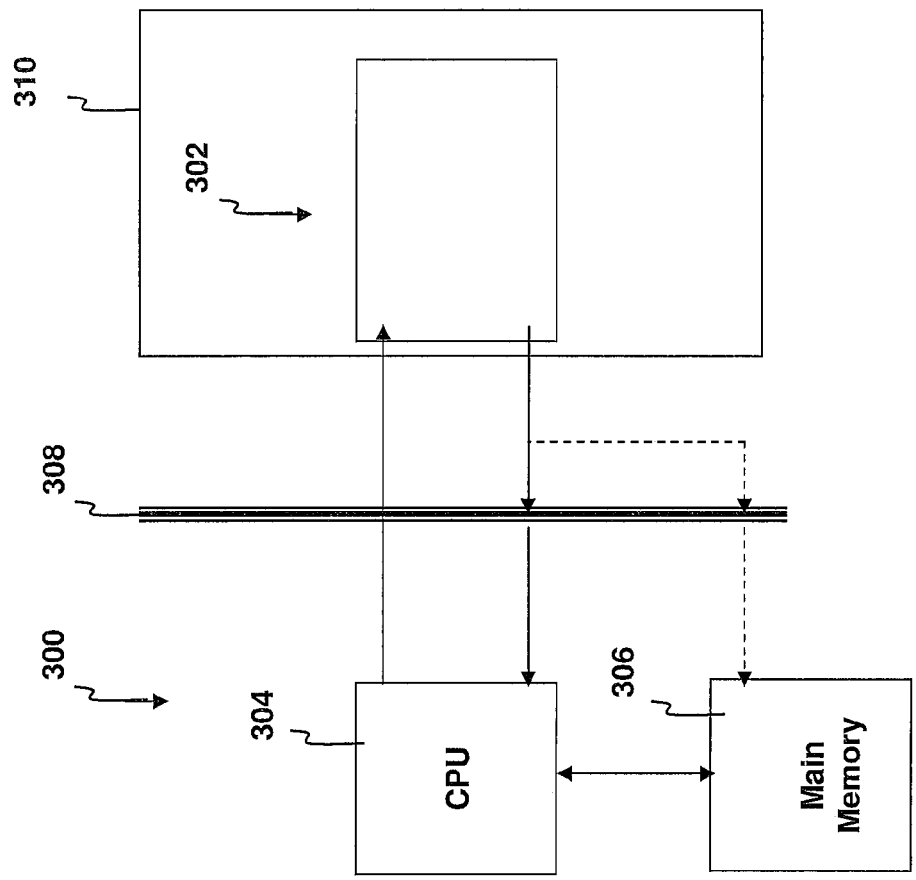
FIG. 7 shows an example of a hardware arrangement in which a stream processor generated by the method of FIG. 5 may be implemented.

FIG. 7 shows a schematic view of a computing device 300 with which an FPGA design 302 formed using the method of the present invention may be used. The computing device 300 comprises a Central Processing Unit (CPU) 304, a main memory 306 and a data bus 308.

The CPU 304 may take any suitable form and comprises a processor for carrying out the instructions of a computer program run on the computing device 300. The CPU 304 is the primary element carrying out the functions of the computing device 300 as is well known in the art. The CPU 304 is commonly located on a motherboard (not shown) which comprises the necessary contacts to supply the CPU 304 with power and to connect the CPU 304 to other components in the computing device 300.

The main memory 306 is associated with the CPU 304 and comprises an area of RAM. The RAM may take the form of SRAM, Dynamic RAM (DRAM) in which bits of data are stored as a charge in a capacitor or transistor gate, or any other suitable memory type. As is common for many computing applications, the main memory 306 may be provided as a plurality of SRAM or DRAM modules. These modules can quickly be replaced should they become damaged or when greater storage capacity is required. The main memory 306 is able to communicate with the CPU 304 via the motherboard forming part of the computing device 300.

The data bus 308 enables additional devices to be connected to the computing device 300 and to communicate with components of the computing device 300. The data bus 308 may take any suitable form, for example a Peripheral Component Interconnect Express (PCI-E) data bus. The data bus 308 acts as a motherboard-level interconnect to link motherboard-mounted peripherals and as an expansion card interface for add-in cards.

The FPGA 302 is located on, in this example, an accelerator card 310. The accelerator card 310 is configured to connect to the data bus 308 and may be, for example, a PCI-E format expansion board comprising interconnects suitable for connecting to a PCI-E data bus.

Whilst, for clarity, only a single accelerator card 310 is included in the following example, it would be readily apparent to the skilled person that additional accelerator cards comprising FPGAs 302 formed according to the method of the present invention may be included to provide additional computational power. For example, four accelerator cards 310 may be included in parallel within one system, with each card communicating to the CPU 304 and to each other. Alternatively, multiple FPGA devices 302 may be provided on a single accelerator card 310.

Variations will be apparent to the skilled person. For example, whilst the herein-described examples relate to the generation of hardware designs for FPGA-based stream processors, the present invention is also applicable to the design of other programmable logic devices or Application Specific Integrated Circuits (ASICs). The skilled person would readily be aware of alternative devices which fall within the scope of the present embodiments.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

Further, the accelerator need not be located on a card attached to a bus. The accelerator may, indeed, in some embodiments form part of a CPU or other processor within a computing system, or may be located on a motherboard with the CPU. Additionally, as discussed, multiple accelerator cards may be provided. Each card may be connected in parallel or in series and may be capable of communicating with the CPU or with other cards via the data bus or other connection.

What is claimed is:

1. A method of generating a hardware design for a pipelined parallel stream processor, the method comprising:
    defining, on a computing device, a processing operation designating processes to be implemented in hardware as part of said pipelined parallel stream processor;
    specifying, on a computing device, at least one propagation rule for said processing operation;
    defining, on a computing device, a graph representing said processing operation as a parallel structure, said graph comprising at least one data path to be implemented as a hardware design for said pipelined parallel stream processor and comprising a plurality of parallel branches, at least some of said branches being configured to enable, when formed in hardware, data values to be streamed through a plurality of parallel branches simultaneously, the or each data path being represented as comprising:
        at least one data path input;
        at least one data path output; and
        at least one discrete object corresponding directly to a hardware element to be implemented in hardware as part of said pipelined parallel stream processor, the or each discrete object comprising an input for receiving at least one input variable represented in a fixed point format; an operator for executing a function on said input variable or variables; and at least one output for outputting an output variable represented in a fixed point format;
    optimizing, on a computing device, the number of bits, the offset, the number format and the rounding mode for each output variable from each discrete object in dependence upon the specified propagation rule or rules to produce an optimized graph; and
    utilizing, on a computing device, said optimized graph to define an optimized hardware design for implementation in hardware as said pipelined parallel stream processor.

2. The method according to claim 1, wherein said processing operation comprises a mathematical function or calculation to be implemented in hardware as said pipelined parallel stream processor.

3. The method according to claim 1, wherein the or each hardware element comprises one or more hardware units on said pipelined parallel stream processor.

4. The method according to claim 1, wherein the or each hardware element is configured to carry out a predetermined mathematical function.

5. The method according to claim 1, wherein the or each propagation rule comprises at least one rule selected from the group of: maximum allowable bit size for the output variable from the or each discrete element; the desired offset of the output variable from the or each discrete element; and the rounding mode used by the or each element to produce an output or outputs therefrom.

6. The method according to claim 5, wherein the or each maximum allowable bit size rule is selected from the group of: the full number of bits generated in a calculation in said discrete element; from the largest of the number of bits in the or each input to a discrete element; a specified maximum value; and a specified exact value.

7. The method according to claim 5, wherein the or each offset rule is selected such that: overflow is prevented; underflow is prevented; the offset is set to the maximum value of the input variable or variables to the or each discrete object; or the offset is set to a predetermined value.

8. The method according to claim 5, wherein the rounding mode rule is selected from the group of: round to zero; round to positive infinity; round to negative infinity; round to nearest value; and round to nearest value with ties to even.

9. The method according to claim 8, wherein the rounding mode is specified manually in the or each propagation rule or is selected automatically in dependence upon a specified parameter.

10. The method according to claim 8, wherein the rounding mode is selected automatically in dependence upon the number of bits rounded off in an output from the or each discrete element.

11. The method according to claim 5, wherein the number format for each output variable is selected from the group of: unsigned; twos complement; and sign-magnitude.

12. The method according to claim 11, wherein the number format is selected automatically in dependence upon the or each propagation rule.

13. The method according to claim 1, wherein a plurality of propagation rules are specified for said processing operation.

14. The method according to claim 13, wherein said processing operation comprises a plurality of data expressions, one or more propagation rules being specified for each data expression.

15. The method according to claim 14, wherein the or each propagation rule is stored in a stack such that the most recent propagation rule is active for subsequent data expressions in said processing operation.

16. The method according to claim 1, wherein said step of optimizing comprises minimizing the amount of hardware elements required to schedule said data path.

17. The method according to claim 1, wherein said graph comprises multiple inputs and multiple outputs, each input and each output being connected to at least one branch of said at least one data path.

18. The method according to claim 1, wherein said graph comprises multiple parallel data paths to be implemented in hardware as said pipelined parallel stream processor, and said step of optimizing is carried out for each of said multiple parallel data paths.

19. The method according to claim 1, wherein said stream processor is implemented on a Field Programmable Gate Array or an Application Specific Integrated Circuit.

20. The method according to claim 1, further comprising the step of forming said optimized hardware design on said stream processor such that said stream processor is operable to perform said processing operation.

21. A method of making a programmable logic device, comprising:
    generating a design using the method of any one of claim 1;
    programming the logic device to embody the generated design.

22. A computer program arranged, when run on a computer, to execute the steps of claim 1.

23. The computer program according to claim 22, stored on a computer-readable medium.

24. A Field Programmable Gate Array, Application Specific Integrated Circuit or other programmable logic device, having a design generated using method of claim 1.

25. A system for generating a hardware stream processor design, the system comprising:
    a processor arranged to execute the method of claim 1 and to generate a list of instructions for the programming of a programmable logic device having the generated design.

* * * * *